No. 839,552. PATENTED DEC. 25, 1906.
G. D. CLAPP.
CONTROLLING DEVICE FOR SPRING SUPPORTED VEHICLE BODIES.
APPLICATION FILED DEC. 26, 1905.

Witnesses:
H. B. Davis
Cynthia Doyle

Inventor:
George D. Clapp.
by Noyes & Harriman
attys.

UNITED STATES PATENT OFFICE.

GEORGE D. CLAPP, OF BOSTON, MASSACHUSETTS.

CONTROLLING DEVICE FOR SPRING-SUPPORTED VEHICLE-BODIES.

No. 839,552.

Specification of Letters Patent.

Patented Dec. 25, 1906.

Application filed December 26, 1905. Serial No. 293,186.

*To all whom it may concern:*

Be it known that I, GEORGE D. CLAPP, of Boston, county of Suffolk, State of Massachusetts, have invented an Improvement in Controlling Devices for Spring-Supported Vehicle-Bodies, of which the following description, in connection with the accompanying drawings, is a specification, like characters on the drawings representing like parts.

When driving an automobile over a rough road, the shock or jar which is given to its spring-supported body by the inequality of the road is severely felt by the rider and is very objectionable, and in case the automobile is heavy and is driven at a high speed this objection is augmented, and, furthermore, there is danger of an accident happening from this cause alone.

This invention has for its object to provide improved means for controlling the movement or vibration of the spring-supported body relative to the running-gear, whereby the above-noted objection is overcome.

The invention consists, essentially, in a controlling device for controlling the vibration or movement of the spring-supported body relative to the running-gear, consisting, essentially, of the yielding member—such, for instance, as a block of rubber, circularly or otherwise formed—and means—as, for instance, a flexible strap—for connecting it with the body, and means—as, for instance, a flexible strap—connecting it with the running-gear.

Figure 1:
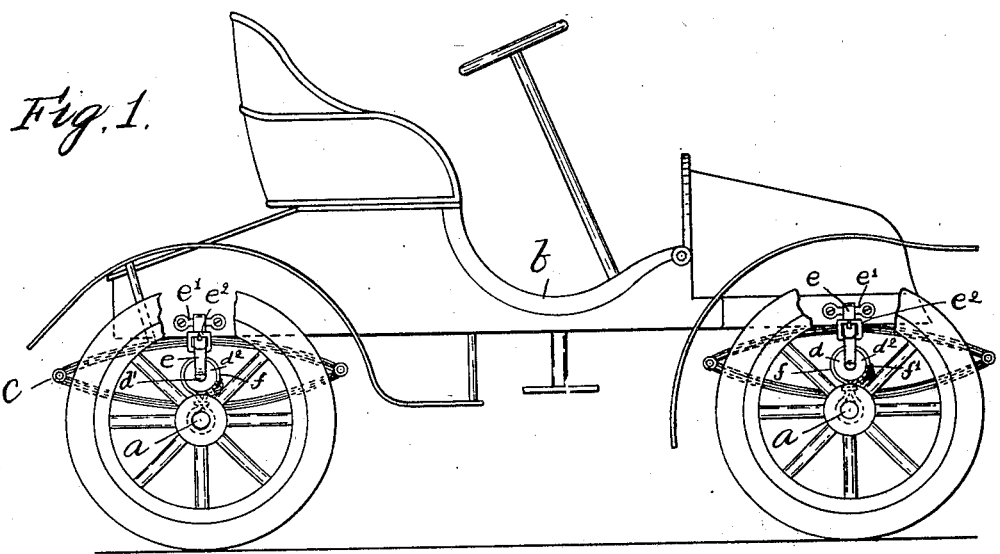
Figure 2:
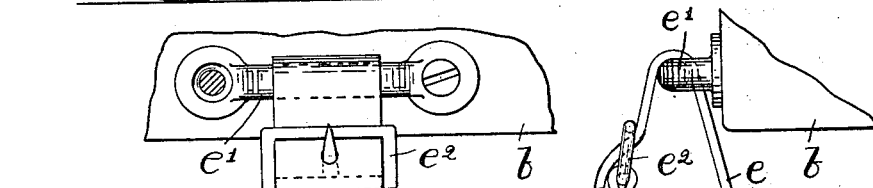
Figure 3:
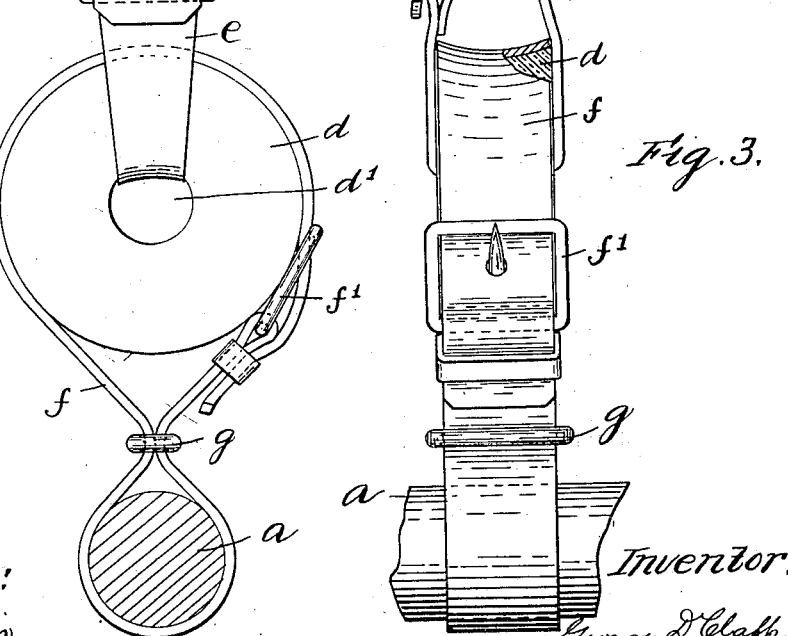

Figure 1 shows in side elevation a sufficient portion of an automobile to illustrate my invention provided with means embodied in my invention for controlling the movement or vibration of its spring-supported body relative to its running-gear. Fig. 2 is an enlarged front elevation of the controlling device, and Fig. 3 is a side elevation of the controlling device.

$a$ represents the axletree, or it may be one of the axles, and $b$ the body of the vehicle, and $c$ one of the springs which support the body. The controlling device embodied in my invention is interposed between the body and axle or axletree or some other stationarily-supported part of the running-gear, being attached at its upper and lower ends, respectively, to said body and running-gear.

The controlling device comprises a yielding member $d$, which is herein shown as a circularly-formed block of rubber having a central hole $d'$ through it. This yielding block will be made quite large and a groove will be formed in its periphery of any suitable dimensions.

A strap $e$ passes through the hole $d'$ in the block $d$ and also around a bar $e'$, which is secured to the body $b$, said strap having a buckle $e^2$ at one end which is adapted to receive the other end of the strap. By this means the yielding block $d$ is flexibly connected with or attached to the body. My invention, however, comprehends any other form of flexible connection between the yielding block and the body and also any other means for attaching said flexible connection to said body and to the block. Another strap $f$ passes around the periphery of the yielding block $d$ and around the axle or other stationarily-supported member $a$ of the running-gear, which has a buckle $f'$ at one end which is adapted to engage the opposite end of the strap. At a point between the yielding block $d$ and the axle or other part $a$ the two portions of the straps are preferably drawn together—as, for instance, a ring or loop $g$ is attached to one portion of the strap, through which the other portion of the strap, is free to pass. By means of the strap $f$ the yielding block is flexibly connected with a stationarily-supported part of the running-gear. My invention, however, comprehends any other form of flexible connection between the yielding block and running-gear and also any other means for attaching said flexible connection to the running-gear and to the block.

When driving the machine over a rough road, as the spring-supported body is suddenly lifted, due to an inequality of the road, said body will pull up on the flexible connections and yielding block and its upward movement thereby restrained in a yielding manner, and no severe shock or jar will be felt.

In practice I prefer to employ four controlling devices for each machine.

Having thus described my invention, what I claim as new, and desire to secure by Letters Patent, is—

1. A controlling device for controlling the movement of a spring-supported vehicle-body relative to the running-gear consisting of a yielding block having a hole through it, a strap passing through said hole and around a bar on the body, and means for connecting said block with the running-gear, substantially as described.

2. A controlling device for controlling the movement of a spring-supported vehicle-body relative to the running-gear, consisting of a circularly-formed block of rubber having a central hole through it, a strap passing through said hole and a strap passing around said block, one of said straps being connected with the body and the other strap being connected with the running-gear, substantially as described.

3. A controlling device for controlling the movement of a spring-supported vehicle-body relative to the running-gear, consisting of a circularly-formed block of rubber having a central hole through it, a strap passing through said hole and a strap passing around said block, one of said straps being connected with the body and the other strap being connected with the running-gear, and a ring embracing the two portions of the strap between the block and running-gear, substantially as described.

In testimony whereof I have signed my name to this specification in the presence of two subscribing witnesses.

GEORGE D. CLAPP.

Witnesses:
B. J. NOYES,
H. B. DAVIS.